United States Patent [19]
Davis et al.

[11] 3,720,089
[45] March 13, 1973

[54] DOUBLE BALL METER PROVER SYSTEM

[75] Inventors: Billy E. Davis; Ronald G. Dunegan, both of Tulsa, Okla.

[73] Assignee: Signet Controls Incorporated, Tulsa, Okla.

[22] Filed: June 16, 1971

[21] Appl. No.: 153,752

[52] U.S. Cl. ............................................73/3
[51] Int. Cl. .....................................G01f 25/00
[58] Field of Search ..........73/3, 40.5 R; 15/104.06 A

[56] References Cited

UNITED STATES PATENTS 3,541,837    11/1970    Davis et al..................................73/3

*Primary Examiner*—Donald O. Woodiel
*Attorney*—James R. Head et al.

[57] ABSTRACT

The meter prover system of this invention uses the conventional test loop of pipe, or barrel, through which a seal ball is carried by the fluid flowing through the meter and through the barrel. The seal ball in its passage through the test loop operates two spaced detectors, and the differential count of the meter during the time of passage of the ball between the two detector stations is compared to the known volume of the barrel between the detector stations. The barrel is formed in a U-shape with the inlet and outlet in relatively close proximity. A ball return conduit connects from the outlet of the barrel to the inlet so that seal balls can be recycled through the system. A portion of the ball return conduit has a diameter less than that of the barrel and means are provided for forcing the seal balls into and through this reduced diameter portion from the outlet to the inlet of the barrel. At least one seal ball remaining in the reduced diameter portion at all times, to prevent fluid flow through the ball return conduit.

2 Claims, 5 Drawing Figures

PATENTED MAR 13 1973 3,720,089
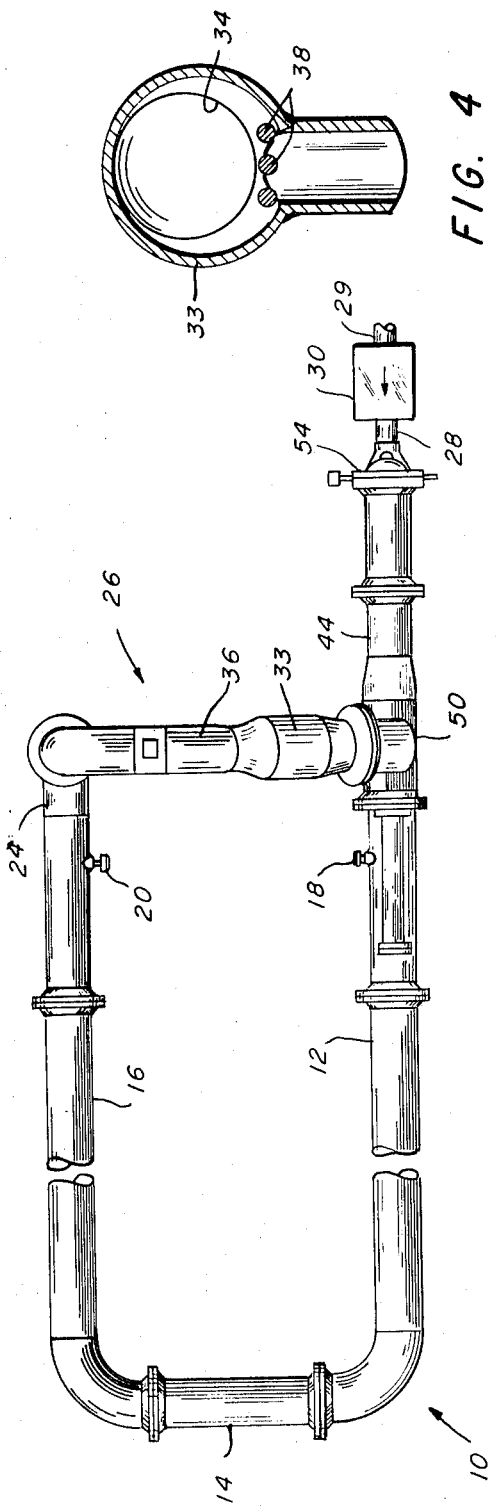
FIG. 1
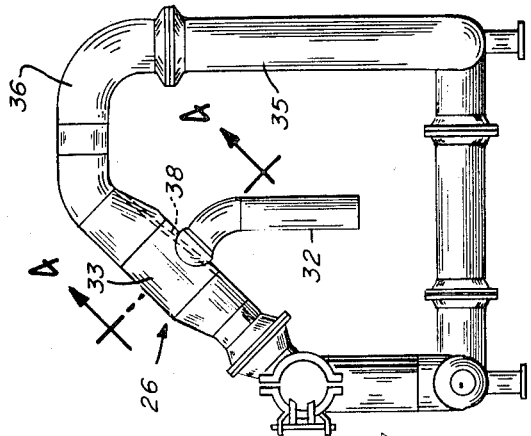
FIG. 2
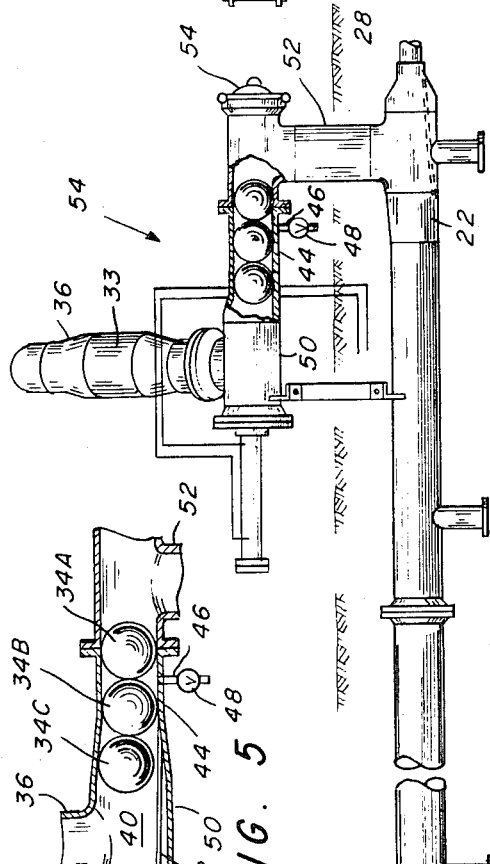
FIG. 3
FIG. 4
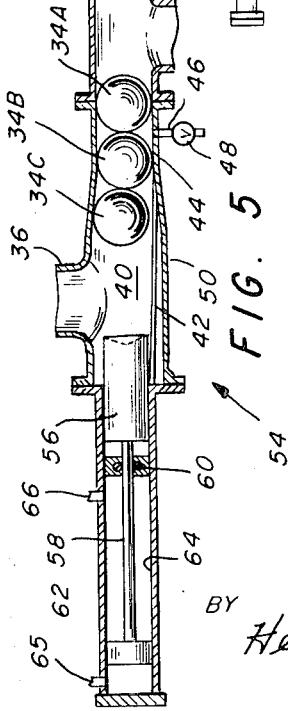
FIG. 5
INVENTOR.
BILLY E. DAVIS
RONALD G. DUNEGAN
BY Head & Johnson
ATTORNEYS

DOUBLE BALL METER PROVER SYSTEM

BACKGROUND OF THE INVENTION

1. Field of the Invention

This invention relates to the field of liquid metering devices. More particularly it relates to the art of calibration of liquid flow meters. Still more particularly it relates to the design of meter provers or calibrating barrels for calibrating liquid flow meters in the environment in which they are used.

2. Description of the Prior Art

For many years, in the petroleum industry, crude oil produced in the field was conveyed from the producing wells by pipeline gathering systems to storage tanks. Such storage tanks also served as metering tanks with the measure of the volume of crude oil being delivered to the purchaser by measurements of the tank and of the depth of liquid in the tank, before and after the delivery.

In recent years a trend has developed toward the use of liquid flow meters to measure the quantity of crude oil that is transferred. Since the value of the crude oil is high, and very large volumes are involved, the accuracy of the meters by which the crude oil is measured is extremely important. A small inaccuracy in the meter can, in a relatively short time, result in a substantial dollar amount of over- or under-payment for the crude oil delivered.

For these reasons it has become important to provide means for accurately calibrating liquid flow meters. It is particularly important that means be provided wherein calibration can be accomplished in which they are used.

In order to gain a broader understanding of the background of this invention, to acquire a better knowledge of the importance of meter provers, and to gain an indication of the efforts of others to fulfill this need, reference may be had to the following United States Pat. Nos. : 2,772,561; 3,021,703; 3,120,118; 3,273,375;, 3,295,357 and 3,541,837. This list is not intended to be exhaustive, but is merely indicative of the various other types of meter provers which have been devised.

In each of these prior art United States patents, meter calibration is accomplished by moving a piston, whether in the form of a cylindrical device, or a ball, in a barrel of uniform diameter. Each of the devices taught in these patents function on the principle that a precise and predetermined amount of fluid flow is required to move a piston within a barrel between spaced points. Fluid is passed through the meter being calibrated and through the calibrating barrel, affording means of a comparison of the meter indication during the time of the passage of the piston from one point to another in the barrel. This arrangement has proven exceedingly satisfactory and is the premise upon which the present invention is founded.

One of the problems which has been encountered in the type of calibrating barrel or piston prover represented by these patents is that of switching the fluid flow so as to pass fluid through the barrel during calibration procedures. In each of the prior instances, and in all known applications of calibrating barrel type meter provers utilized to date, some valving arrangement is required to switch the fluid flow to pass the flow through the calibrating barrel during proving of the meter, and to bypass the calibrating barrel during other times when the meter is not being proved. These valving arrangements consists generally of manifolding a plurality of valves or utilizing a single multiport valve. In either instance the expense of valving constitutes a substantial portion of the expense of providing a meter prover. In addition, in order to assure the absolute accuracy of the provers it is unequivocally required that such valving systems have no leakage whatsoever. Thus the quality of valves utilized must be high, further increasing the expense of such valving arrangements.

SUMMARY OF THE INVENTION

This invention overcomes the difficulties and weaknesses of the prior art devices by providing a calibrating barrel particularly useful in proving meters, which obviates the need for a fluid switching valving arrangement. In this invention a U-shaped barrel is provided, with a bypass, or ball return conduit connecting from the outlet to the inlet. A short section of this bypass is of slightly smaller diameter than the barrel, so that a seal ball in this section will fit tightly enough that the fluid pressure in the system will not move it. Thus, flow through the bypass if fully blocked when one or more balls are in this section, and all fluid flowing through the meter will pass through the barrel. There must be at least one seal ball in the bypass at all times. Seal balls, after passing through the barrel are forced into and through the reduced diameter section by mechanical means.

It is therefore a general object of this invention to provide an improved calibrating barrel of the type useful in calibrating meters.

A more particular object of this invention is to provide an improved calibrating barrel arranged in such a manner that no valving is required to switch fluid flow or to provide for bypass of ball members during meter calibration.

These and other objects and the principles of this invention will be apparent from the following description taken in connection with the appended drawings, in which:

BRIEF DESCRIPTION OF THE DRAWINGS

FIGS. 1, 2 and 3 show three views of one embodiment of this invention in which the ball handling portion of the ball return conduit is in a part of the conduit intermediate the ends thereof.

FIGS. 4 and 5 show additional detail of the embodiment of FIGS. 1, 2 and 3.

DESCRIPTION OF THE PREFERRED EMBODIMENTS

Refer now to the drawings, and in particular to FIGS. 1, 2 and 3, which show three views of one embodiment of the invention. The invention includes a U-shaped calibrating barrel generally indicated by the numeral 10, a ball return conduit 26 and a ball sealing and handling section generally indicated by the numeral 54.

Fluid flow into the barrel 10 is through inlet pipe 29, meter 30, and pipe 28 into the inlet 22 to the barrel 10. The barrel comprises two long, substantially parallel legs 12 and 16 joined at one end by pipe leg 14 and at the other end by the ball return conduit 26. The barrel has an inlet 22 and an outlet 24, and the ball return conduit is connected adjacent the inlet and the outlet. Two stations for detecting the passage of the balls through the barrel are provided; one, 18 near the inlet and the other 20, near the outlet. These detecting stations sense the passage of the seal balls. Generally they comprise switch means, with a short lever extending through the wall of the pipe from the outside to the inside of the pipe. The passage of the ball forces the lever outward, thus actuating the switch. These detecting stations are well known in the art and form no part of this invention.

The barrel is constructed of uniform internal diameter, and the volume of the barrel between the two detecting stations is known. Two or more seal balls 34A, 34B, 34C are provided. These have an outer diameter substantially equal to that of the barrel, so that once inserted into the barrel (as will be described below) they will be driven along the barrel by fluid flow, without leakage of fluid past the ball in either direction. Thus the passage of a ball between stations 18 and 20 coupled with the known volume of the barrel is an accurate measure of the fluid flow. If means are provided (as is well known in the art) to record the indication of the meter 30 at the times of passage of a ball past stations 18 and 20, the differential reading of the meter should be the same as the known volume of the barrel. Thus an accurate calibration can be made, while operating the meter in the same environment in which it normally operates.

Apparatus for, and the process of calibrating the meter utilizing the indications from the stations 18, 20, are necessary parts of the use of this invention and are fully described in our copending application Ser. No. 15,817 and in our U.S. Pat. No. 3,541,837. This description is incorporated by reference in this application.

Referring again to FIG. 3, the outlet 24 of the barrel connects to a riser pipe 35, the outlet of which is at higher elevation than the inlet 22 to the barrel. The fluid flow out of the system is through pipe 32, which is connected to an enlarged diameter intermediate portion 33 of pipe 36, which is itself connected to riser 35. The opening leading to outlet pipe 32 is covered by a bar or bars 38, shown in more detail in FIG. 4, so that seal balls leaving the barrel outlet 24 will move up riser pipe 35, into intermediate portion 33 of pipe 36, along the rods 38 and into space 40 (FIG. 5) in the horizontal pipe 50. Here there are other rods 42 that slope downward and carry a ball from 40 toward the right to a sealing portion 44 of pipe 50 of reduced diameter. This portion 44 of reduced diameter is slightly smaller than the diameter of the barrel 10, so that the balls 34 fit snugly, and seal the pipe 44 against fluid flow. The balls 34 fit so snugly that the force due to fluid pressure in the ball return conduit, or bypass, will not move the balls and they must be forced along the conduit mechanically.

Means are provided, in the form of a piston 56 (FIG. 5) to press the balls into and through the reduced diameter section 44. The piston is connected to rod 58, which is sealed through bulkhead 60, and connected at its other end to piston 62 in cylinder 64. Fluid pressure through pipe 65 on the left side of piston 62 will force it to the right, pressing ball 34C against ball 34B, and against ball 34A, all farther into the pipe portion 44, until ball 34A passes through the portion 44 and drops into the enlarged pipe 52 and into the inlet to the barrel 22. The movement of the hydraulic (or pneumatic) piston 62 is limited so that at its farthest position to the right, there are always at least two balls 34A and 34B in position to seal the bypass or ball return conduit 26 against fluid flow from system inlet 28 or from system outlet 32. Thus all fluid flowing through the meter 30 must flow through the barrel 10.

The ball return conduit 26 is made up of sections of pipe 35, 36, 33, 50 and 52 which are larger in diameter than the barrel and thus the seal balls can readily pass through them. The portion 44 is, as described above, of reduced diameter to hold the balls firmly in position and seal the pipe. The seal balls are well known in the art and typically are hollow spheres of rubber filled with a liquid so that their average density is greater than that of the liquid being metered. Thus the balls entering the bypass from riser 35 will freely fall into pipe 50, and when forced from pipe 44 will fall through pipe 52 into the inlet 22 of the barrel. Of course, any other type of seal ball can be used, so long as it is adapted to move sealably through the barrel 10 and to seal pipe 44.

The stroke of the piston 62 is such that two balls 34A and 34B are left in the portion 44 in the positions shown in FIGS. 1 and 5 with both balls in the sealing position. In order to insure that the entire flow of the meter is passing through the barrel, it is necessary to see that no fluid flows through pipe 44 past balls 34A and 34B. To do this, a small opening through the wall of pipe portion 44 is made in the space between the circumferential lines of contact (seal) of the balls. This opening connects to pipe 46 and valve 48. When valve 48 is opened, if there is no flow of liquid, then proof is had that there is no flow of liquid past ball 34A from the inlet 28, and no flow past ball 34B from the outlet 32. The absolute pressure of the liquid in the barrel is much greater than the differential pressure across the pipe 44, which is just equal to the pressure drop due to flow through the barrel. Thus, opening valve 48 imposes a severe seal condition on the balls, and if no liquid flows through the valve, assurance is had that the bypass is sealed.

METHOD OF OPERATION OF THE PREFERRED EMBODIMENT

This invention is adapted to be coupled into the fluid flow line 28 at all times and the fluid flow to be metered passes through the barrel 10. The bypass or ball return conduit 26 is sealed at all times by at least two balls 34A and 34B, and by means of valve 48 indication can be had of the effectiveness of the seal at the balls.

When it is desired to prove the meter, the piston 62 is moved to the right until ball 34A drops into the pipe 52, leaving balls 34B and 34C in pipe 44. Piston 62 is retracted by connecting fluid pressure to pipe 66, leaving the space 40 clear for the ball to be returned.

The ball 34A drops through pipe 52, and is swept up by the fluid flowing into the barrel through inlet 22. The ball, sealing the barrel, is moved through the pipe 12, past detecting station 18. Here switch contact is made and means (not shown) are initiated to start counting the flow through meter 30. The ball passes through legs 12 and 14, into and through leg 16 and operating detecting station 20. The closing of switch 20 stops the count of the meter. The ball continues through outlet 24, up riser pipe 35 and into bypass 26 into pipe 50, where it stays until the next time the meter 30 is to be proved. The volume represented by the differential count of the meter 30 between the closings of the switches at 18 and 20 by the passage of the ball, is compared to the known volume of the barrel, and a measure is had of the accuracy of the meter.

In the configuration shown in FIGS. 1, 2 and 3, the reduced diameter portion of the bypass is placed at a convenient position intermediate the top end and the bottom end of the bypass or ball return conduit.

In FIGS. 1, 2 and 3 the barrel is shown with the U portion in a horizontal plane, and with a riser pipe 35 carrying the liquid and the balls to an upper position from which the balls can be dropped down through pipes 36 and 52 into the inlet. It will be understood that other configurations can be used equally well.

Also, it will be clear that if the feature represented by pipe 46 and valve 48 for testing the seal of the balls in portion 44 is not desired, adequate seal can be provided by one ball (34A) and in that case, only two seal balls are required to operate the system, instead of the three balls as shown.

While we have described our invention with a certain degree of particularity, it will be understood that this invention is not to be limited to the abstract herein, nor the summary nor the illustrative embodiments which have been presented for purposes of exemplifying specific arrangements of the invention, but the invention is to be limited only by the scope of the appended claim or claims, including the full range of equivalency to which each element or step thereof is entitled.

What is claimed is:

1. A calibrating barrel comprising:
    a. a U-shaped barrel of uniform internal diameter lying in a horizontal plane, having an inlet and an outlet;
    b. a ball return conduit having a vertical riser portion communicating with said barrel adjacent said outlet, an intermediate enlarged diameter portion, and a sealing portion having internal diameter less than said barrel and communicating with said barrel inlet by means of a vertical pipe, intermediate enlarged diameter portion having a fluid outlet therein, the intermediate and sealing portions of said ball return conduit being elevationally above said barrel and the sealing portion being parallel to said barrel;
    c. at least a first and a second seal ball member, each having a diameter substantially equal to the inner diameter of said barrel and adapted to sealably move through said barrel by fluid flow, said seal balls adapted to snugly fit said reduced diameter sealing portion of said ball return conduit, and thereby resist movement under the pressure of said fluid;
    d. diverting means within said return conduit intermediate portion adjacent said fluid outlet whereby said balls after passing through said barrel are diverted into said sealing portion of said ball return conduit, at least one of said balls being at all times in sealing engagement within the reduced diameter sealing portion, thereby preventing fluid flow through said ball return conduit;
    e. ball forcing means adapted to be moved substantially longitudinally into said reduced diameter sealing portion of said ball return conduit, and adapted to be pressed against at least a second ball, and to force said second ball into and along said reduced diameter portion, thereby forcing a first ball already in said reduced diameter portion to said reduced diameter portion and into the inlet of said barrel, and limiting means to prevent said ball forcing means from directly forcing said second ball through said reducing diameter portion; and
    f. means to move said ball forcing means along said ball return.

2. A calibrating barrel as in claim 1 wherein said ball return conduit sealing portion is perpendicular to said enlarged diameter intermediate portion.

* * * * *